United States Patent
Oka

(10) Patent No.: US 11,460,635 B2
(45) Date of Patent: Oct. 4, 2022

(54) OPTICAL WAVEGUIDE DEVICE

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/160,057

(22) Filed: Jan. 27, 2021

(65) Prior Publication Data

US 2021/0325607 A1 Oct. 21, 2021

(30) Foreign Application Priority Data

Apr. 15, 2020 (JP) .............................. JP2020-072612

(51) Int. Cl.
*G02B 6/122* (2006.01)
*G02B 6/14* (2006.01)
(Continued)

(52) U.S. Cl.
CPC ............. *G02B 6/1228* (2013.01); *G02B 6/14* (2013.01); *G02B 2006/12061* (2013.01);
(Continued)

(58) Field of Classification Search
CPC ............. G02B 6/105; G02B 6/12004; G02B 6/11221; G02B 6/1223; G02B 6/1226;
(Continued)

(56) References Cited

U.S. PATENT DOCUMENTS 7,546,014 B2 6/2009 Yamamoto et al.
9,195,001 B2 * 11/2015 Hatori .................... G02B 6/305
(Continued)

FOREIGN PATENT DOCUMENTS

JP 2007-148290 A 6/2007
JP 2016-42115 A 3/2016

OTHER PUBLICATIONS

Leuthold et al., "Silicon-Organic Hybrid Electro-Optical Devices," IEEE Journal of Selected Topics in Quantum Electronics, vol. 19, No. 6, 2013, 13 pages.
(Continued)

*Primary Examiner* — Michael P Mooney
(74) *Attorney, Agent, or Firm* — Staas & Halsey LLP

(57) ABSTRACT

An optical waveguide device that is implemented between a slot waveguide and a rectangular waveguide includes: a tapered portion and a separation portion. The tapered portion includes first and second cores that are respectively coupled to cores of the slot waveguide and formed in parallel each other. The separation portion includes third and fourth cores that are respectively coupled to the first and second cores. Cross-sectional areas of the first and second cores are substantially equal each other at an input end. The cross-sectional area of the first core is larger than that of the second core at an output end. A shape of a cross section of the first core changes continuously between the input end and the output end in the tapered portion. A spacing between the third core and the fourth core is continuously extended in the separation portion.

10 Claims, 17 Drawing Sheets

(51) Int. Cl.
*G02B 6/12* (2006.01)
*G02F 1/21* (2006.01)
*G02F 1/225* (2006.01)

(52) U.S. Cl.
CPC .............. *G02B 2006/12097* (2013.01); *G02B 2006/12147* (2013.01); *G02F 1/212* (2021.01); *G02F 1/225* (2013.01)

(58) Field of Classification Search
CPC ...... G02B 6/1228; G02B 6/124; G02B 6/125; G02B 6/126; G02B 6/136; G02B 6/14; G02B 6/2726; G02B 6/2773; G02B 6/305; G02B 6/4215; G02F 1/011; G02F 1/0136

USPC .......................................................... 385/43
See application file for complete search history.

(56) References Cited

U.S. PATENT DOCUMENTS

| | | |
|---|---|---|
| 9,835,798 B2 | 12/2017 | Oka |
| 2007/0122080 A1 | 5/2007 | Yamamoto et al. |
| 2017/0139136 A1 | 5/2017 | Oka |

OTHER PUBLICATIONS

Palmer et al., "Low-Loss Silicon Strip-to-Slot MODE Converters," IEEE Photonics Journal, vol. 5, No. 1, Feb. 2013, 10 pages.

* cited by examiner

RECTANGULAR WAVEGUIDE

SLOT WAVEGUIDE

Related Art

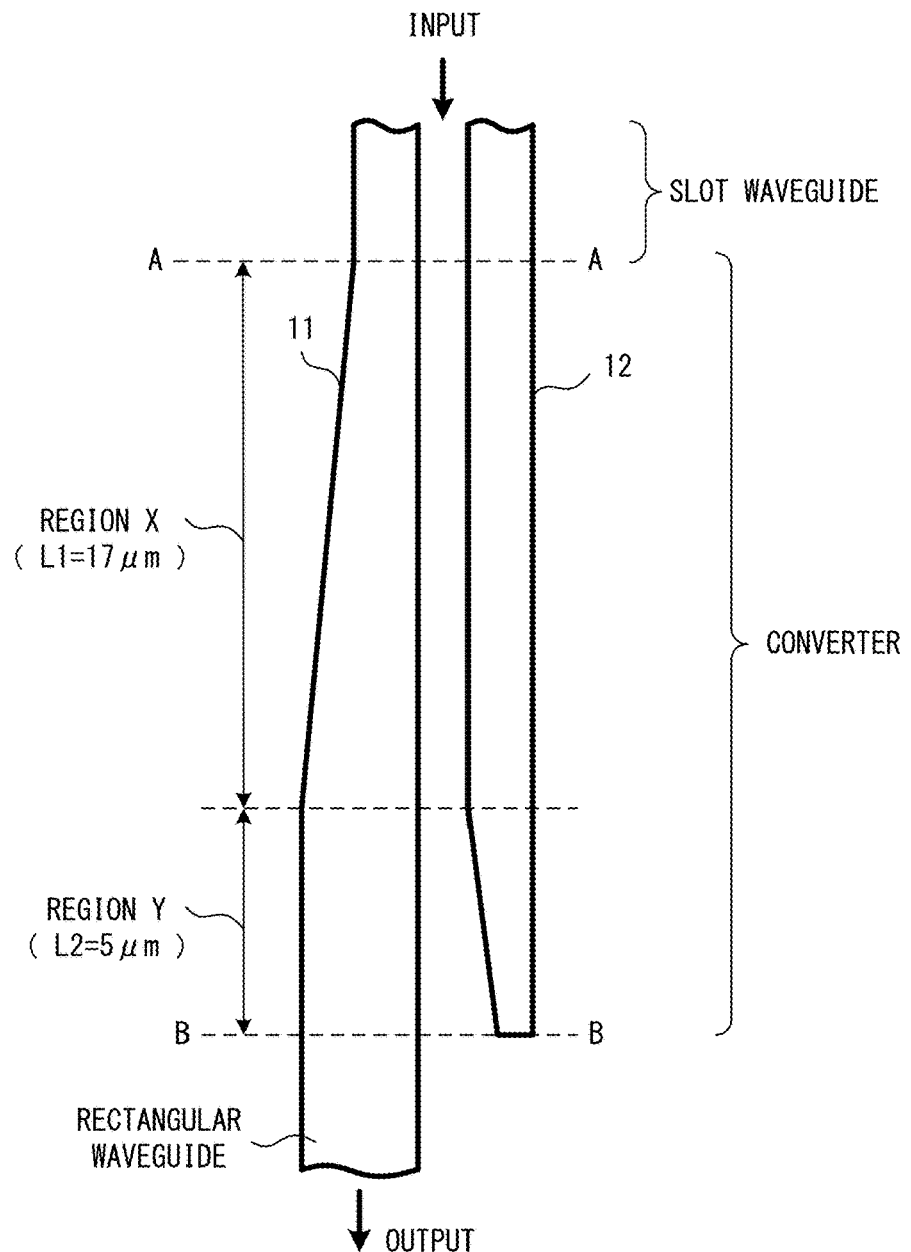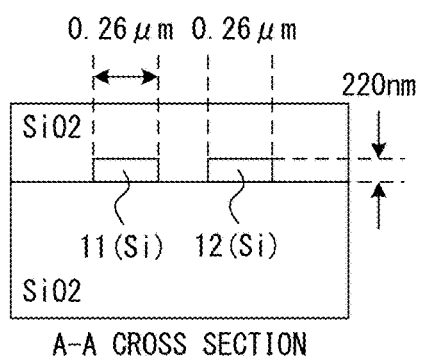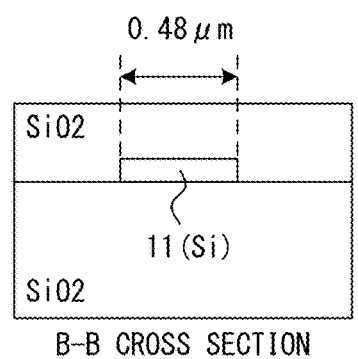
FIG. 4

F I G. 1 3 A
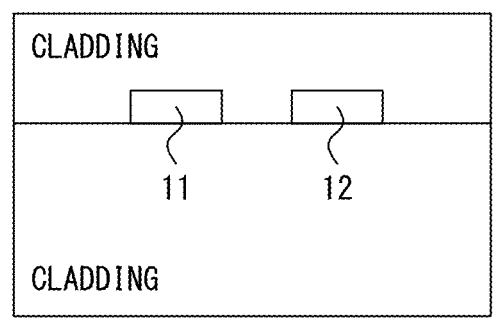
F I G. 1 3 B
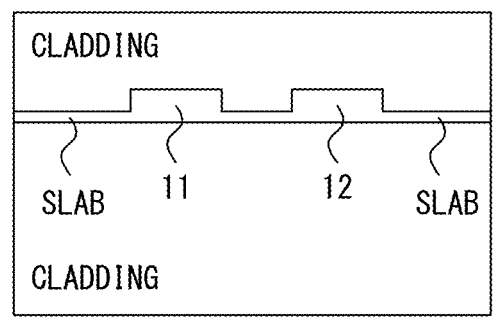

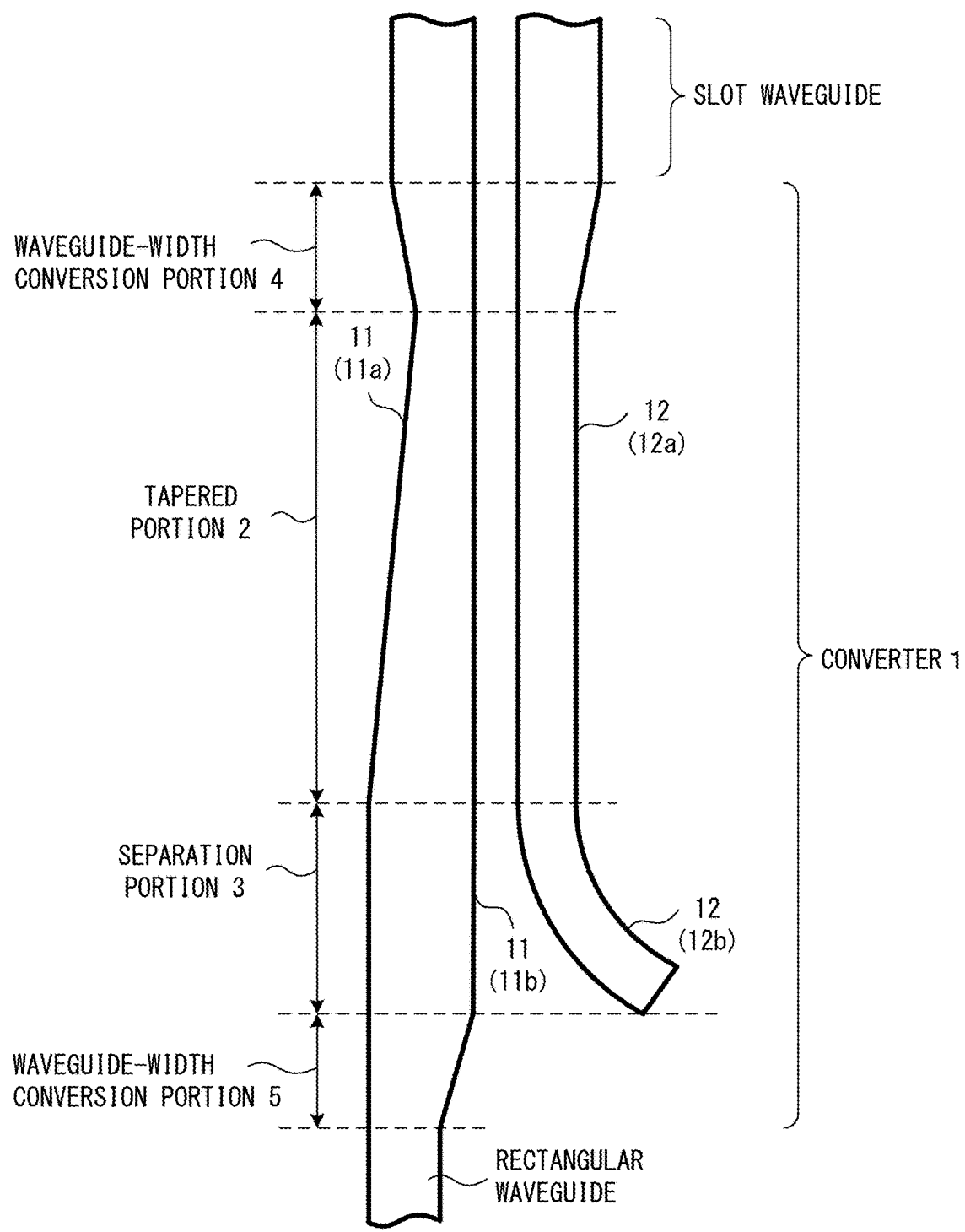
F I G. 15

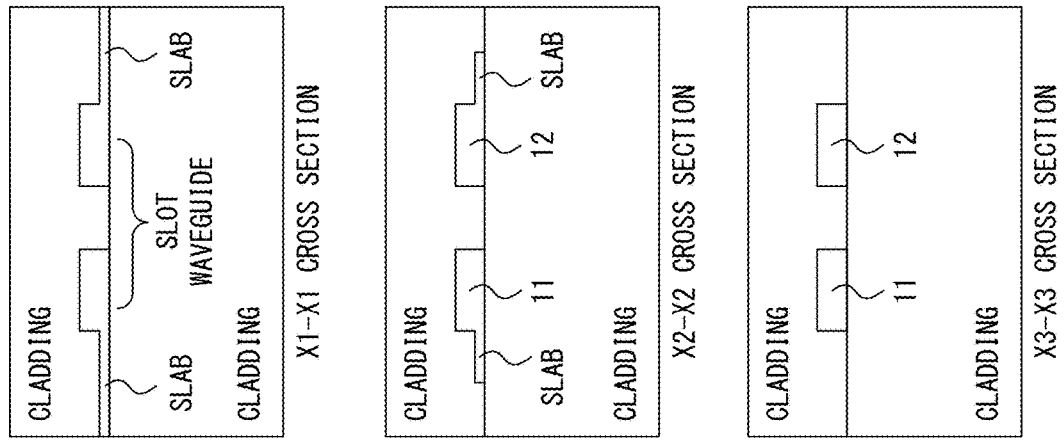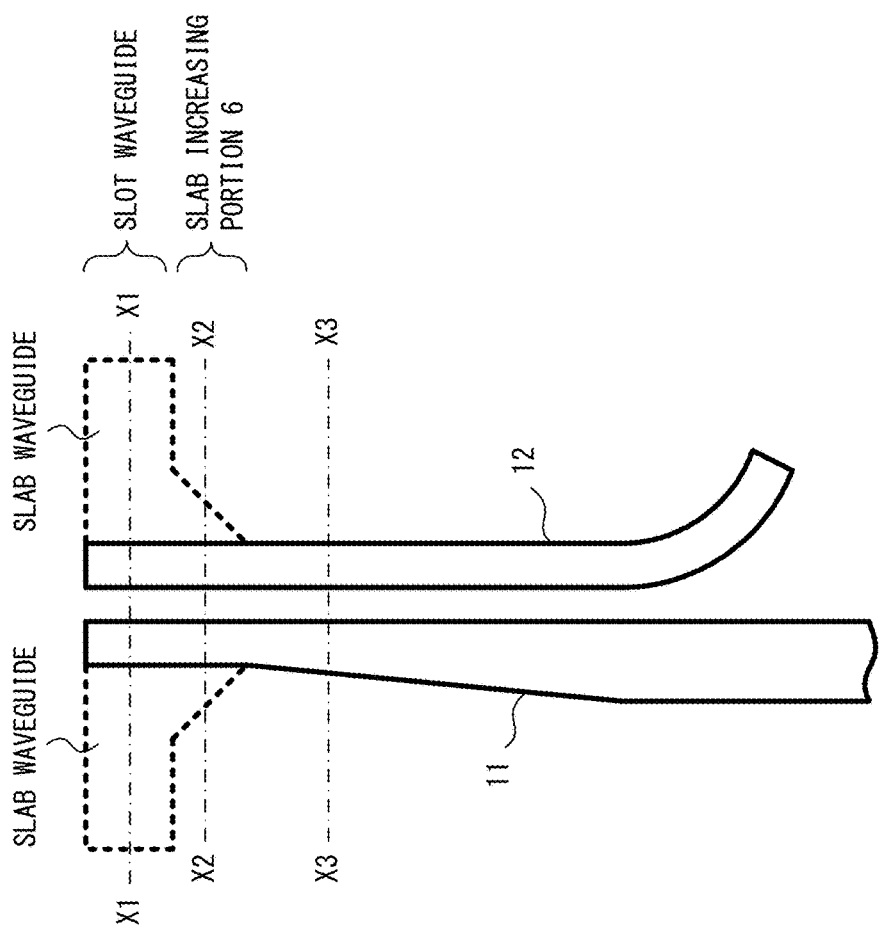
FIG. 16

OPTICAL WAVEGUIDE DEVICE

CROSS-REFERENCE TO RELATED APPLICATION

This application is based upon and claims the benefit of priority of the prior Japanese Patent Application No. 2020-072612, filed on Apr. 15, 2020, the entire contents of which are incorporated herein by reference.

FIELD

The embodiments discussed herein are related to an optical waveguide device that is implemented between a slot waveguide and a rectangular waveguide.

BACKGROUND

In recent years, the development of optical integrated devices that can be downsized and/or large-scale integrated using silicon photonics techniques has been advanced. In a silicon photonics technique, an optical waveguide is formed in, for example, the surface region of a silicon-on-insulator (SOI) wafer. In this case, as depicted in FIGS. 1A and 1B, a core is formed from, for example, Si, and a cladding is formed from, for example, SiO2.

An optical waveguide may be used on a substrate as an optical wire through which an optical signal propagates. The shape of a cross section of the core is, for example, a rectangle as depicted in FIG. 1A. Hereinafter, a common optical waveguide may be referred to as a rectangular waveguide.

On the other hand, the development of optical devices (e.g., optical modulators) using an optical waveguide that includes a pair of cores formed in parallel as depicted in FIG. 1B has been advanced. An optical waveguide that includes a pair of cores formed in parallel may hereinafter be referred to as a "slot waveguide."

For example, a polymer having a refractive index that varies in accordance with an applied voltage may be provided between two cores forming a slot waveguide. A modulated optical signal for carrying data is generated by applying a voltage signal indicating transmission data to the optical waveguide. In this case, optical electric fields are concentrated in the region interposed between the two cores in the slot waveguide. Thus, the interaction between electric fields and light will be efficient in an optical modulator using a slot waveguide. An optical modulator using a slot waveguide is described in, for example, document 1.

However, forming an optical wire having a small bend radius using a slot waveguide could lead to large optical loss. By contrast, optical electric fields are concentrated in the core in a rectangular waveguide. Thus, forming an optical wire using a rectangular waveguide will minimize optical loss that could occur due to leakage of light to the outside of the core even when the bend radius is small. Accordingly, optical wires will preferably be formed using rectangular waveguides in order to attain a miniaturized optical integrated device.

When an optical integrated device that includes a downsized efficient optical modulator is formed, both a rectangular waveguide and a slot waveguide could be implemented on the substrate. Such an optical integrated device needs to be provided with a device for coupling the rectangular waveguide and the slot waveguide (i.e., a device for converting the waveguide structure between the rectangular waveguide and the slot waveguide). A converter for converting the waveguide structure between a rectangular waveguide and a slot waveguide is described in, for example, document 2. Techniques relevant to the present application are described in Japanese Laid-open Patent Publication No. 2016-042115, U.S. Pat. No. 9,835,798, Japanese Laid-open Patent Publication No. 2007-148290, and U.S. Pat. No. 7,546,014.

Document 1: R. Palmer et al. Silicon-Organic Hybrid Electro-Optical Devices, IEEE JOURNAL OF SELECTED TOPICS IN QUANTUM ELECTRONICS, Vol. 19, No. 6, February 2013

Document 2: R. Palmer et al. Low-Loss Silicon Strip-to-Slot Mode Converters, IEEE Photonics Journal, Vol. 5, No. 1, February 2013

As described above, converters for converting waveguide structures between rectangular waveguides and slot waveguides have been proposed. However, conventional converters could have a risk of propagation of high-order mode components. For example, in a case where light propagating through a slot waveguide is guided to a rectangular waveguide, high-order mode components could have a high likelihood of propagating to the rectangular waveguide.

SUMMARY

According to an aspect of the embodiments, an optical waveguide device that is implemented between a slot waveguide and a rectangular waveguide, the optical waveguide device includes: a tapered portion; and a separation portion that is implemented between the tapered portion and the rectangular waveguide. The tapered portion includes a first core that is coupled to one of cores of the slot waveguide, and a second core that is coupled to the other of the cores of the slot waveguide and formed parallel to the first core. The separation portion includes a third core that is coupled to the first core and the rectangular waveguide, and a fourth core that is coupled to the second core. A cross-sectional area of the first core and a cross-sectional area of the second core are substantially equal at a first end of the tapered portion that is located on a side on which the slot waveguide is provided. The cross-sectional area of the first core is larger than the cross-sectional area of the second core at a second end of the tapered portion that is located on a side on which the separation portion is provided. A shape of a cross section of the first core changes continuously between the first end and the second end in the tapered portion. A spacing between the third core and the fourth core is continuously extended in the separation portion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a converter coupling a slot waveguide and a rectangular waveguide;

FIGS. 13A and 13B illustrate variations of the shape of a cross section of a core;

FIG. 15 illustrates an example of a converter having a function for converting the widths of waveguides;

FIG. 16 illustrates an example of the configuration of a converter attained when a slot waveguide includes slabs.

DESCRIPTION OF EMBODIMENTS

Figure 2:
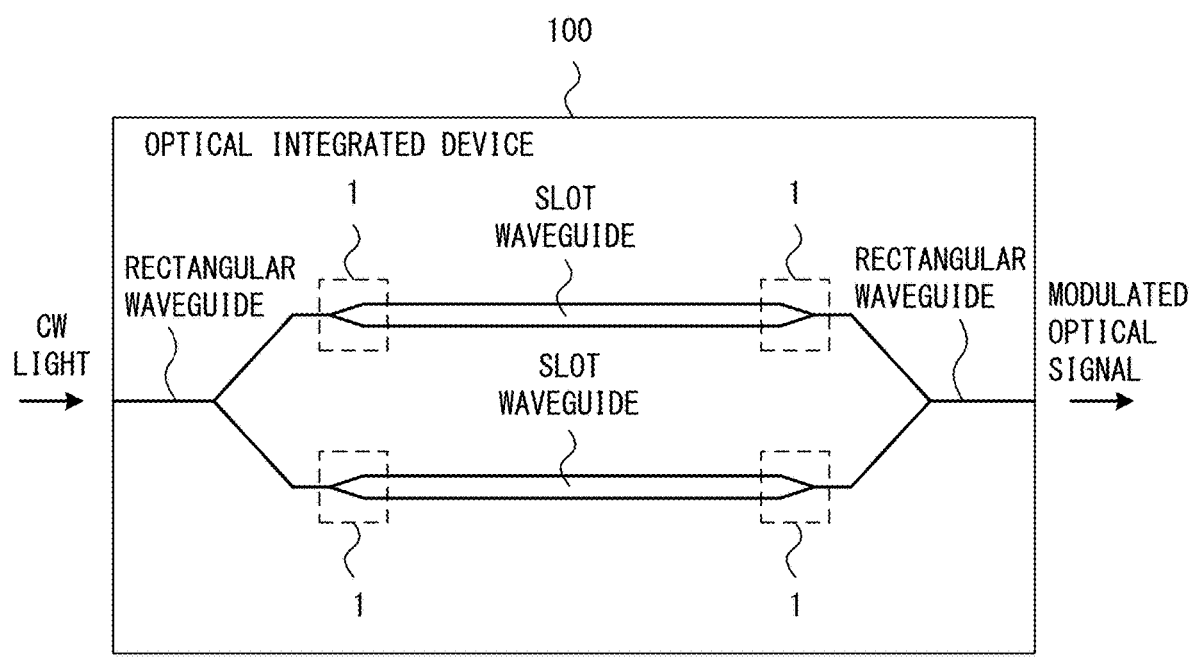
FIG. 2 illustrates an example of an optical integrated circuit in accordance with embodiments of the invention.

FIG. 2 illustrates an example of an optical integrated circuit in accordance with embodiments of the invention. In this example, an optical integrated device 100 includes a Mach-Zehnder optical modulator. However, the optical integrated device 100 may include other optical devices.

The Mach-Zehnder optical modulator includes an input optical waveguide, an upper-arm optical waveguide, a lower-arm optical waveguide, and an output optical waveguide. The upper-arm optical waveguide and the lower-arm optical waveguide are formed in parallel to each other. Input CW light is guided from the input optical waveguide to the upper-arm optical waveguide and the lower-arm optical waveguide. A signal electrode (not illustrated) is provided in the vicinity of each of the upper-arm optical waveguide and the lower-arm optical waveguide. The phase of CW light propagating through each of the upper-arm optical waveguide and the lower-arm optical waveguide is controlled by a signal applied to the signal electrode. Optical signals output from the upper-arm optical waveguide and the lower-arm optical waveguide are combined in the output optical waveguide. As a result, a modulated optical signal is generated.

Figure 1A:
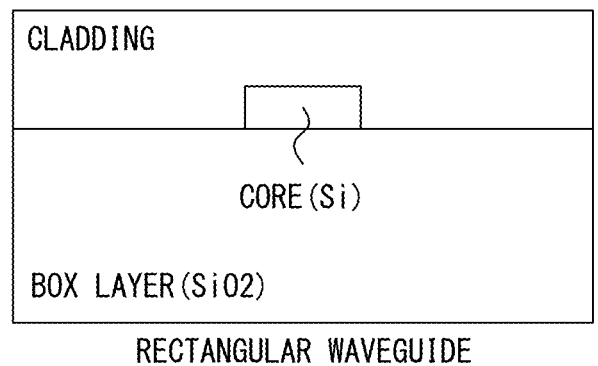
FIGS. 1A and 1B illustrate examples of a rectangular waveguide and a slot waveguide.

In the optical integrated device 100, the input optical waveguide and the output optical waveguide are each formed from the rectangular waveguide depicted in FIG. 1A. The upper-arm optical waveguide and the lower-arm optical waveguide are each formed from the slot waveguide depicted in FIG. 1B. Thus, as depicted in FIG. 2, the optical integrated device 100 includes optical waveguide devices coupling the rectangular waveguides to the slot waveguides (i.e., optical waveguide devices that convert waveguide structures between the rectangular waveguides and the slot waveguides). Each of the optical waveguide devices may hereinafter be referred to as a "converter 1."

Figure 3:
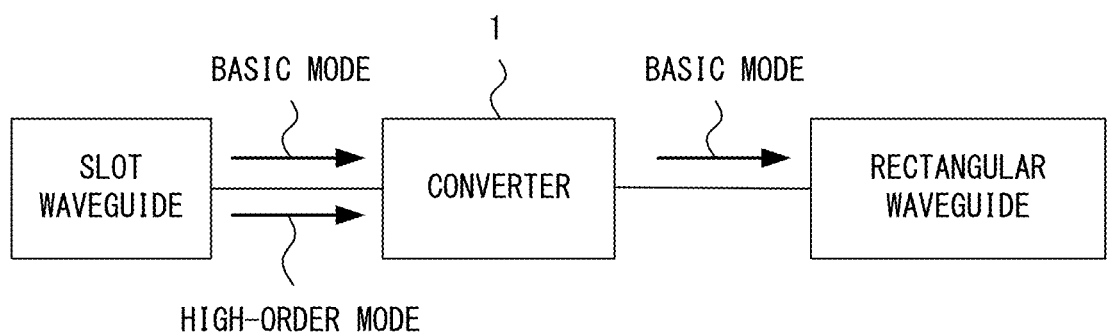
FIG. 3 illustrates the function of a converter.

FIG. 3 illustrates the function of a converter 1. The converter 1 is implemented between a slot waveguide and a rectangular waveguide. In the example depicted in FIG. 3, the converter 1 guides light propagating through the slot waveguide to the rectangular waveguide. However, the converter 1 may be configured to guide light propagating through the rectangular waveguide to the slot waveguide.

Optical loss in the converter 1 is preferably small. Especially when the converter 1 is used in an optical communication system transmitting wavelength division multiplex (WDM) signals, optical loss in the converter 1 is preferably small over a wide bandwidth.

Figure 1B:
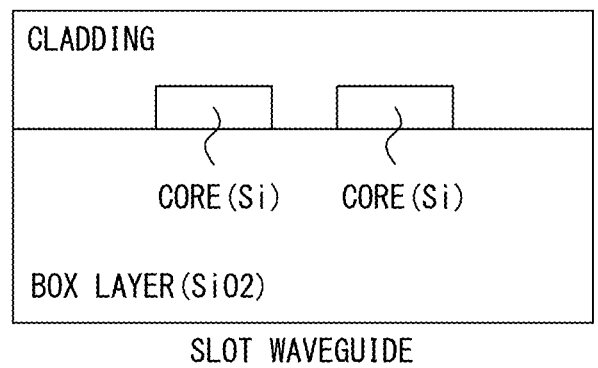

The slot waveguide is formed from two cores formed in parallel as depicted in FIG. 1B. Thus, the slot waveguide is typically a multimode waveguide having two waveguide modes (a basic mode and a high-order mode (primary high-order mode)). In this example, the basic mode is a mode in which optical electric fields are concentrated in a region between the two cores. The basic mode may be referred to as an even mode. The primary high-order mode may be referred to as an odd mode.

The multimode waveguide could have conversion between the basic mode and the high-order mode due to a production error in the waveguide structure (e.g., an error resulting from a random change in the waveguide width that could be seen in a light traveling direction due to roughness of a sidewall of a core). Conversion between the basic mode and the high-order mode could also arise when a discontinuous boundary is provided on a cross section perpendicular to the light traveling direction due to uneven application of an electro-optical (EO) polymer.

When a basic mode component and a high-order mode component are present in an optical waveguide (e.g., a rectangular waveguide) through which an optical signal propagates, the high-order mode could be converted to the basic mode due to a production error in the waveguide structure. Thus, the original basic mode component and the basic mode component generated due to the conversion will interfere with each other. In this case, the communication quality will be decreased. Accordingly, the converter 1 will desirably have a function for preventing a high-order mode component generated in the slot waveguide as depicted in FIG. 3 from propagating to the rectangular waveguide.

FIG. 4 illustrates an example of a converter coupling a slot waveguide and a rectangular waveguide. In this example, the converter guides light propagating through the slot waveguide to the rectangular waveguide.

The converter is formed over a region X and a region Y. The converter is formed from a waveguide 11 and a waveguide 12. The "waveguide 11" may hereinafter indicate a core of the waveguide 11. The "waveguide 12" may indicate a core of the waveguide 12.

The waveguides 11 and 12 are coupled at an end A-A depicted in FIG. 4 to a pair of optical waveguides forming the slot waveguide. The shape of the cross section of the waveguide 11 at the end A-A is the same as the shape of the cross section of the waveguide 12 at the end A-A. Meanwhile, the waveguide 11 is coupled at an end B-B to the rectangular waveguide. The area of the cross section of the waveguide 11 at the end B-B is larger than the area of the cross section of the waveguide 11 at the end A-A. Specifically, the width of the cross section of the waveguide 11 at the end B-B is greater than the width of the cross section of the waveguide 11 at the end A-A. The shape of the waveguide 11 continuously changes in the region X. In particular, in the region X, the width of the waveguide 11 gradually increases in the direction from the end A-A toward the end B-B. In the region Y, the width of the waveguide 11 is almost constant, and the width of the waveguide 12 gradually decreases toward the end B-B.

In this example, the converter guides light propagating through the slot waveguide to the rectangular waveguide. Thus, an optical signal is input from the slot waveguide to the converter. In this example, input light from the slot waveguide to the converter contains a basic mode component and a high-order mode component.

As an example, the following descriptions are based on the assumption that TE mode light is input to the converter. A TE mode is a waveguide mode in which an electric field component perpendicular to the light traveling direction and horizontal to the substrate is a main component. In the following descriptions, the basic mode of TE mode light may be referred to as "TE0," and the primary high-order mode of TE mode light may be referred to as "TE1." TE0 is the waveguide mode with the highest effective refractive index among the TE modes. TE1 is the waveguide mode with the second highest effective refractive index among the TE modes.

L1 (the length of the region X in the light traveling direction) and L2 (the length of the region Y in the light traveling direction) depicted in FIG. 4 are designed such that a loss of TE0 component input to the converter and then output via the waveguide 11 is sufficiently small. In this example, L1 is 17 μm, and L2 is 5 μm. The cores of the waveguides 11 and 12 have an equal height of 220 nm. The width of the core of each of the waveguides 11 and 12 at the end A-A is 0.26 μm. The width of the core of the waveguide 11 at the boundary between the regions X and Y is 0.48 μm. The width of the core of the waveguide 11 at the end B-B is also 0.48 μm.

Figure 5:
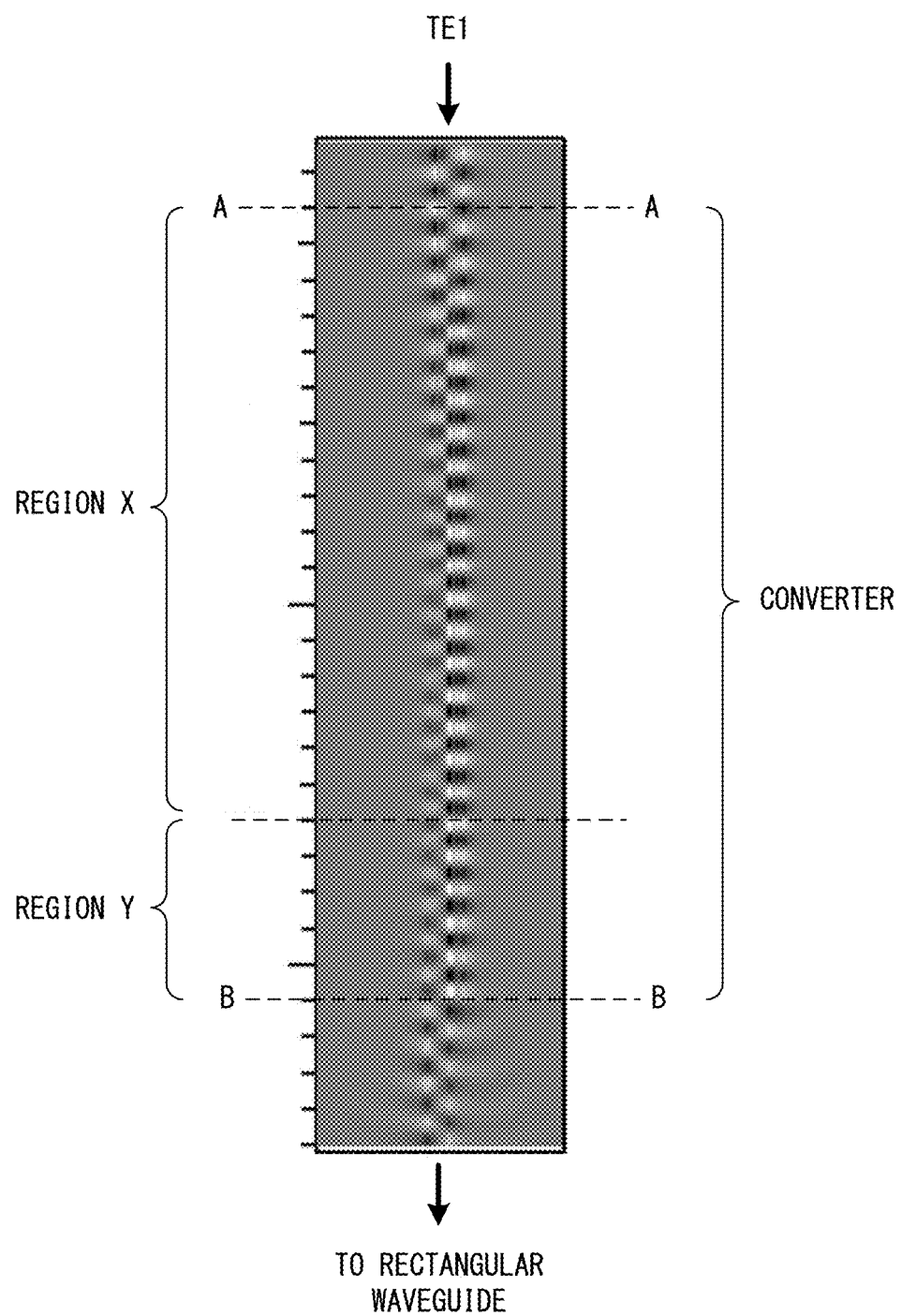
FIG. 5 illustrates a simulation result for electric fields attained when a TE1 component is input to a converter depicted in FIG. 4.

FIG. 5 illustrates a simulation result for electric fields attained when a TE1 component is input to the converter depicted in FIG. 4. In FIG. 5, as the whiteness level increases, the positive electric field becomes stronger. In addition, as the blackness level increases, the negative electric field becomes stronger. Thus, the white and black stripe pattern indicates a state in which the TE1 component propagates through the optical waveguides in the converter.

As depicted in FIG. 5, the TE1 component input to the converter propagates through regions X and Y and arrives at the end B-B. Portions of the TE1 component arriving at the end B-B are output from the waveguide 11 to the rectangular waveguide. In the simulation depicted in FIG. 5, about 70 percent of the power of the TE1 component input to the converter is output to the rectangular waveguide.

As described above, in the configuration depicted in FIG. 4, the TE1 component is not removed in the converter. Thus, when light input to the converter contains a TE0 component and a TE1 component, not only the TE0 component but also the TE1 component is guided to the rectangular waveguide. In this case, the original TE0 component and a TE0 component resulting from conversion of the TE1 component could interfere with each other in the rectangular waveguide and thus decrease the communication quality.

The TE1 component is not sufficiently removed in the converter depicted in FIG. 4, because the waveguides 11 and 12 are located close to each other at the output end of the converter (i.e., end B-B). In particular, the waveguide 12 has, at the end B-B, an edge in the light traveling direction. Thus, an electric field resulting from the TE1 component propagating through the waveguide 12 is generated at the end B-B. However, since the waveguides 11 and 12 are located close to each other at the end B-B, the electric field generated in the vicinity of the edge of the waveguide 12 due to the TE1 component arrives at the waveguide 11. As a result, portions of the TE1 component are guided to the rectangular waveguide.

Embodiments

Figure 6:
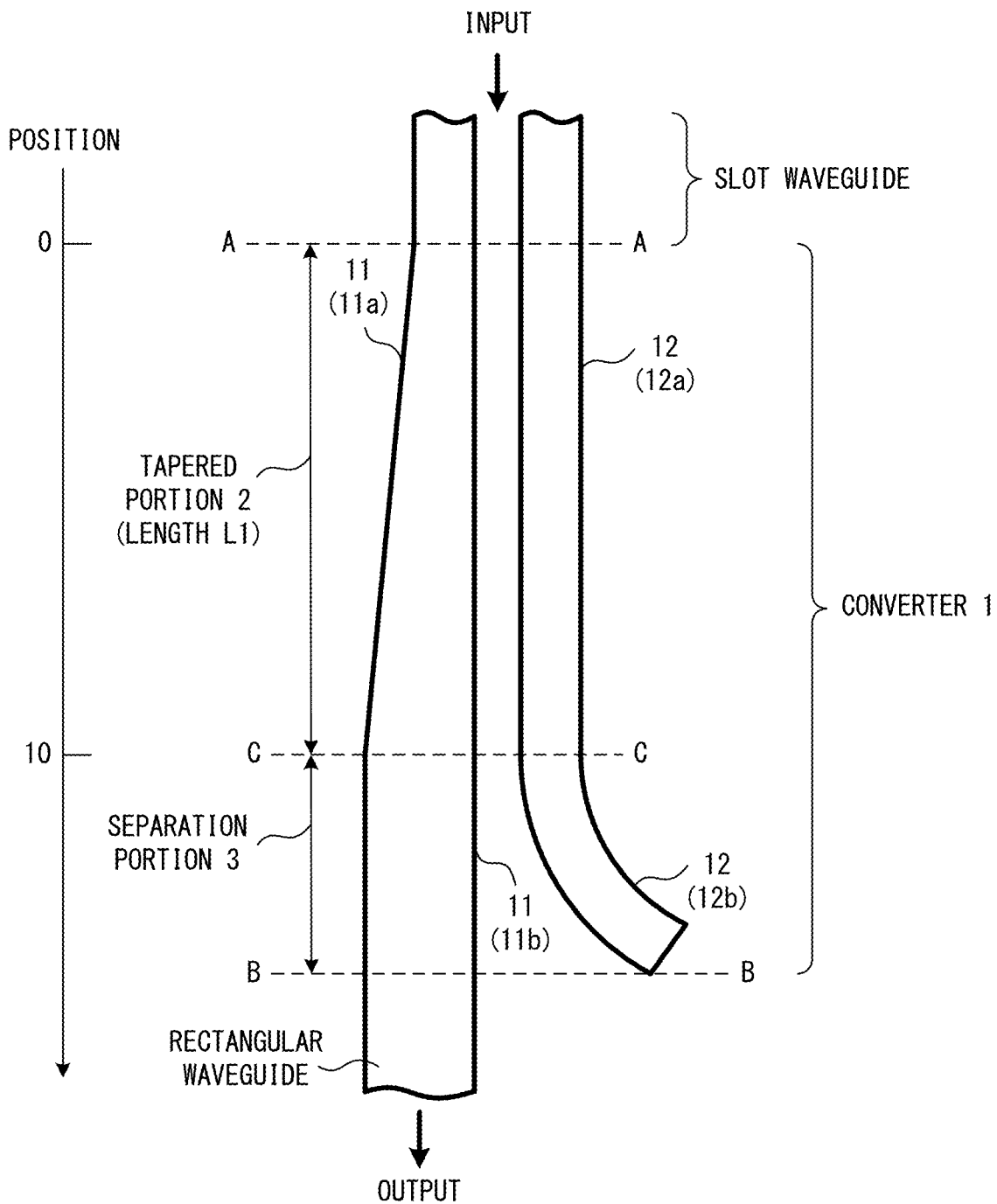
FIG. 6 illustrates an example of a converter in accordance with embodiments of the invention.

FIG. 6 illustrates an example of a converter in accordance with embodiments of the invention. The converter 1 depicted in FIG. 6 is implemented between a slot waveguide and a rectangular waveguide and used as an optical waveguide device coupling the slot waveguide and the rectangular waveguide. In this example, the converter 1 guides light propagating through the slot waveguide to the rectangular waveguide.

Note that the core of an optical waveguide may hereinafter be referred to as a "waveguide." For example, a "waveguide 11" may indicate a core of the waveguide 11. Similarly, a "waveguide 12" may indicate a core of the waveguide 12.

As depicted in FIG. 6, the converter 1 includes a tapered portion 2 and a separation portion 3. The tapered portion 2 is connected to the slot waveguide. The separation portion 3 is implemented between the tapered portion 2 and the rectangular waveguide.

The converter 1 includes a waveguide 11 and a waveguide 12. The portion of the waveguide 11 formed in the tapered portion 2 may hereinafter be referred to as a "waveguide 11a," and the portion of the waveguide 11 formed in the separation portion 3 may hereinafter be referred to as a "waveguide 11b." Similarly, the portion of the waveguide 12 formed in the tapered portion 2 may hereinafter be referred to as a "waveguide 12a," and the portion of the waveguide 12 formed in the separation portion 3 may hereinafter be referred to as a "waveguide 12b."

The tapered portion 2 includes the waveguides 11a and 12a. The waveguide 11a is coupled to one of the cores of the slot waveguide, and the waveguide 12a is coupled to the other of the cores of the slot waveguide. The waveguides 11a and 12a are formed straight. The waveguides 11a and 12a are parallel to each other. Note that "parallel" may include "almost parallel" or "substantially parallel."

The separation portion 3 includes the waveguides 11b and 12b. One end of the waveguide 11b is coupled to the waveguide 11a, and the other end of the waveguide 11b is coupled to the rectangular waveguide. The waveguide 12b is coupled to the waveguide 12a.

"Couple" indicates waveguides (or the cores of waveguides) being optically coupled to each other. Accordingly, for example, "the waveguides A and B are coupled" may indicate that the waveguides A and B are directly coupled or connected or may indicate that the waveguides A and B are optically coupled via another waveguide or the like.

The cross-sectional area of the core of the waveguide 11a and the cross-sectional area of the core of the waveguide 12a are substantially equal at the end of the tapered portion 2 on the side on which the slot waveguide is provided (i.e., end A-A). In this example, the shape of the cross section of the core of the waveguide 11a and the shape of the cross section of the core of the waveguide 12a are substantially the same at the end A-A. Although not particularly limited, the cores of the waveguides 11a and 12a have a width of 0.26 μm and a height of 0.22 μm at the end A-A. The heights of the cores of the waveguides (11a, 11b, 12a, 12b) are constant.

The cross-sectional area of the core of the waveguide 11a at the end of the tapered portion 2 on the side on which the separation portion 3 is provided (i.e., end C-C) is larger than that of the waveguide 12a. Specifically, the width of the core of the waveguide 11a at the end C-C is greater than that of the waveguide 12a. Although not particularly limited, the width of the core of the waveguide 11a is 0.48 µm at the end C-C.

In the tapered portion 2, the shape of the cross section of the core of the waveguide 11a changes continuously between the end A-A and the end C-C. In particular, in the tapered portion 2, the width of the core of the waveguide 11a gradually increases in the direction from the end A-A toward the end C-C. By contrast, the width of the core of the waveguide 12a is almost constant in the tapered portion 2.

For example, the length L1 of the tapered portion 2 (the length of the portion extending from the end A-A to the end C-C) may be designed in accordance with the policy described above by referring to FIG. 4. In this case, the length L1 is designed such that a loss of TE0 component input to the converter 1 and then output to the rectangular waveguide is sufficiently low. In this example, the length L1 is 17 µm.

The waveguide 11b is formed in the separation portion 3 such that the waveguide 11a and the waveguide 11b are located on the same straight line. Note that the width of the waveguide 11b in the separation portion 3 is constant and equal to the width of the waveguide 11a at the end C-C.

The waveguide 12b is formed such that the direction in which light propagates through the waveguide 11b and the direction in which light propagates through the waveguide 12b are different from each other in the separation portion 3. In particular, the waveguide 12b is formed such that the spacing between the waveguide 11b and the waveguide 12b is continuously extended in the separation portion 3. For example, the waveguide 12b may be implemented by a curved waveguide having a constant curvature. In this case, the radius of curvature R is not particularly limited and may be, for example, about 20 µm. It will be easy to design a configuration in which the curvature of a curved waveguide is constant. However, the waveguide 12b may be implemented in another configuration. For example, the waveguide 12b may be shaped like a clothoid curve. In this case, the curvature will continuously change in the boundary between the waveguides 12a and 12b, thereby decreasing the influence of scattering of a high-order mode component (e.g., TE1) that would occur at discontinuous points.

Figure 7:
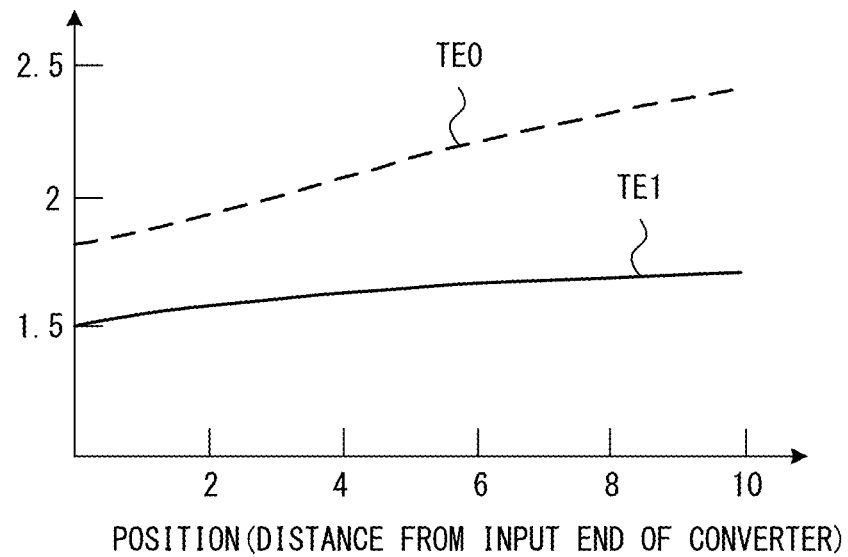
FIG. 7 illustrates an effective refractive index for light propagating through a waveguide in a converter.

FIG. 7 illustrates an effective refractive index for light propagating through the waveguide in the converter 1. The horizontal axis of the graph depicted in FIG. 7 indicates positions in the converter 1. A "position" indicates a distance from the end A-A in the light traveling direction. In this example, the position of the end A-A is "zero," and the position of the end C-C is "10." Thus, the horizontal axis is normalized with the length of the tapered portion 2 as "10." The vertical axis indicates an effective refractive index.

An effective refractive index is dependent on the waveguide mode of light. As a general rule, the effective refractive index in the basic mode is higher than that in the high-order mode. In the example depicted in FIG. 7, the effective refractive index of TE0 is higher than that of TE1.

An effective refractive index is also dependent on the shape of a waveguide through which light propagates. For example, the larger the cross-sectional area of the core of a waveguide through which light propagates is, the higher the effective refractive index tends to be. When the cross-sectional areas of the cores of a pair of adjacent waveguides are different, the electric field in the basic mode tends to be localized in the waveguide with the larger core cross-sectional area. The cross sectional area of the core of the waveguide 11a in the converter 1 becomes larger as the distance from the end A-A increases. Thus, the influence of the waveguide 11a on the basic mode component becomes dominant as the distance from the end A-A increases. Accordingly, as depicted in FIG. 7, the effective refractive index of TE0 gradually increases as the distance from the end A-A increases.

Figure 8:
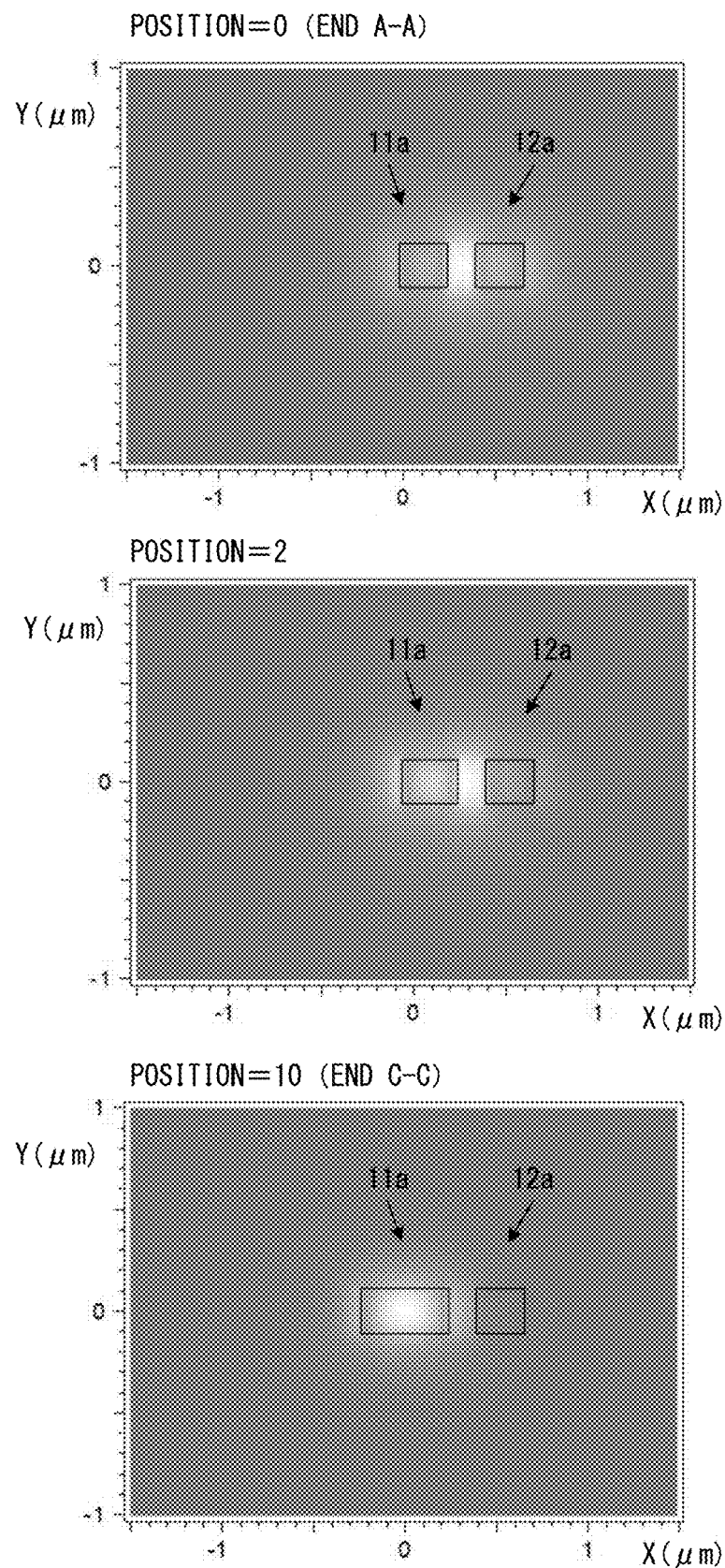
FIG. 8 illustrates examples of electric field distributions in a basic mode TE0.
Figure 9:
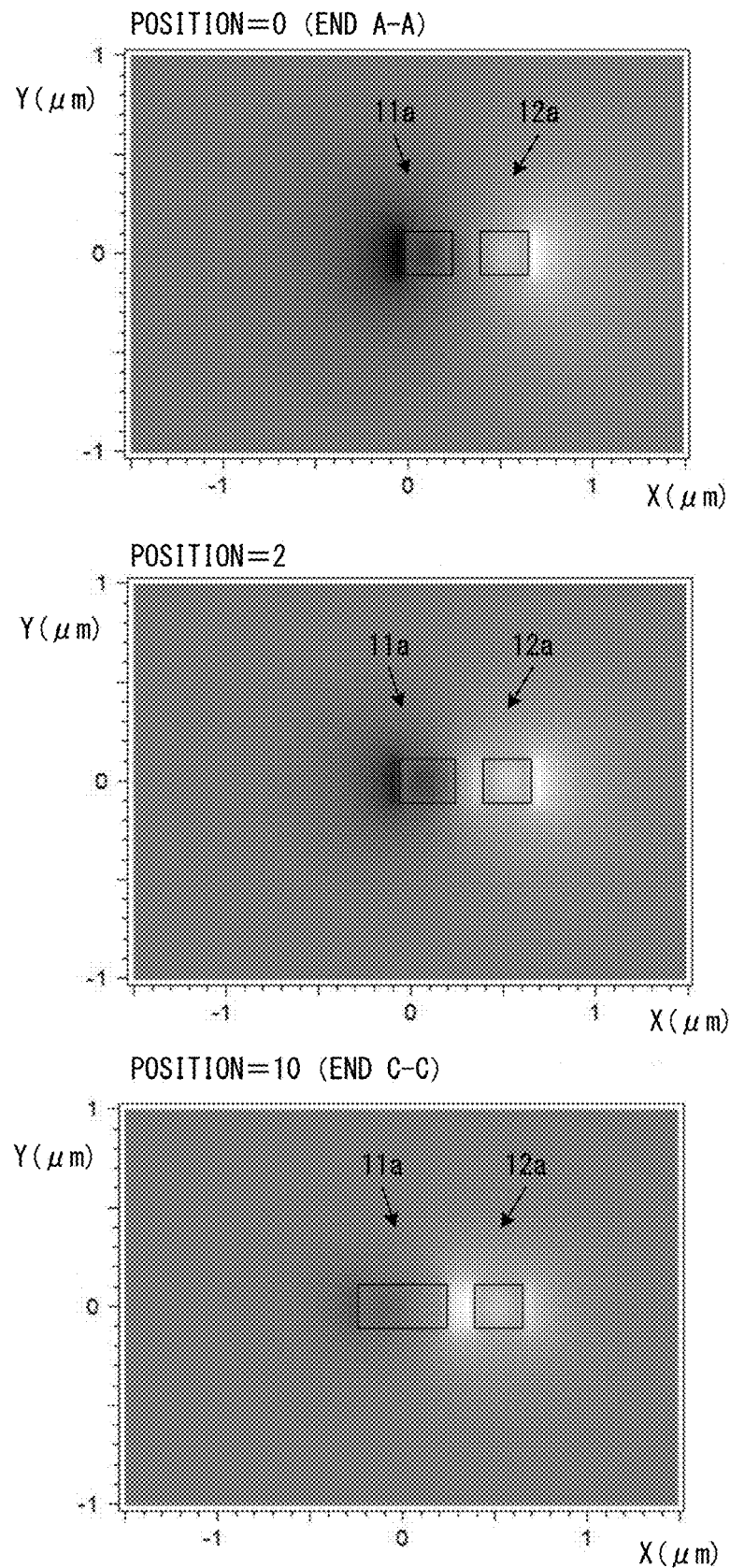
FIG. 9 illustrates examples of electric field distributions in a high-order mode TE1.

FIG. 8 illustrates examples of electric field distributions in the basic mode TE0. FIG. 9 illustrates examples of electric field distributions in the high-order mode TE1. In FIGS. 8-9, the X axes indicate positions in a direction parallel to the substrate and orthogonal to the light traveling direction. The Y axes indicate positions in a direction perpendicular to the substrate. As in the case depicted in FIG. 5, the positive electric field becomes stronger as the whiteness level increases, and the negative electric field becomes stronger as the blackness level increases. Rectangular areas depicted in FIGS. 8-9 indicate the positions of the waveguides 11a and 12a.

When the shapes of the cores of a pair of adjacent waveguides are the same, a phase matching condition is satisfied for this pair of waveguides. When the phase matching condition is satisfied for a pair of waveguides, the electric fields of light propagating through the waveguides are distributed equally between the two cores. Thus, electric fields are distributed equally between the pair of waveguides 11a and 12a at the position zero (i.e., the end A-A of the tapered portion 2). In particular, the electric fields of the basic mode component TE0 at the position zero are localized in the region between the two cores, as depicted in FIG. 8. As depicted in FIG. 9, the positive electric field of the high-order mode component TE1 at the position zero is strong in the vicinity of one of the cores (in this example, the core of the waveguide 12a), and the negative electric field of the high-order mode component TE1 at the position zero is strong in the vicinity of the other core (in this example, the core of the waveguide 11a).

When the shapes of the cores of a pair of adjacent waveguides are different, the phase matching condition is not satisfied for this pair of waveguides. In this case, the components in each of the waveguide modes tend to be localized in either of the cores. In particular, the electric field in the waveguide mode with the higher effective refractive index tends to be localized in the waveguide having the core with the larger cross-sectional area. The electric field in the waveguide mode with the lower effective refractive index tends to be localized in the waveguide having the core with the smaller cross-sectional area. Hence, when input light contains a basic mode component TE0 and a high-order mode component TE1, the electric field in the basic mode TE0 will be localized in the waveguide having the core with the larger cross-sectional area, and the electric field in the high-order mode TE1 will be localized in the waveguide having the core with the smaller cross-sectional area.

The cross sectional area of the core of the waveguide 11a in the converter 1 becomes larger as the distance from the end A-A increases. Meanwhile, the cross-sectional area of the core of the waveguide 12a is almost constant. As depicted in FIG. 8, the electric field in the basic mode TE0 is localized more in the waveguide 11a as the distance from the end A-A increases. In particular, at the position zero (the end A-A of the tapered portion 2), a white region (i.e., a region with a strong electric field) is present between the pair of cores, and at the position 10 (the end C-C of the tapered portion 2), a white region is localized in the core of the waveguide 11a.

As depicted in FIG. 9, the electric field in the high-order mode TE1 is localized more in the waveguide 12a as the distance from the end A-A increases. In particular, at the position zero (the end A-A of the tapered portion 2), a white region (i.e., a region with a strong positive electric field) is present in the vicinity of the core of the waveguide 12a, and a black region (i.e., a region with a strong negative electric field) is present in the vicinity of the core of the waveguide 11a. By contrast, at the position 10 (the end C-C of the tapered portion 2), the electric field is weak in the vicinity of the core of the waveguide 11a.

With respect to each of the modes, the section extending from the position 0 at which the electric fields are localized in both cores to the position 10 at which the electric fields are localized in one of the cores includes the waveguide having a shape continuously changing in the light traveling direction, i.e., a tapered waveguide. When the taper length changes sufficiently gently, a mode at a certain cross section (e.g., TE0 at cross section 0) can be converted to the same mode at another cross section (e.g., TE0 at cross section 10) with negligible loss. This is generally referred to as "adiabatic conversion."

According to the above principle, when light input to the converter 1 contains a basic mode component TE0 and a high-order mode component TE1, the basic mode component TE0 will be output at the end C-C via the waveguide 11a. Thus, the basic mode component TE0 input from the waveguide 11a to the separation portion 3 will be guided to the rectangular waveguide via the waveguide 11b.

At the end C-C, a large proportion of the power of the high-order mode component TE1 is localized in the waveguide 12a. The high-order mode component TE1 localized in the waveguide 12a is guided to the waveguide 12b formed in the separation portion 3. As depicted in FIG. 6, the spacing between the waveguides 11b and 12b is continuously extended in the separation portion 3. The leading end of the waveguide 12b is distant from the waveguide 11b. Thus, the electric field of the high-order mode component TE1 guided to the waveguide 12b substantially does not reach the waveguide 11b. Hence, only a small amount of high-order mode component TE1 is output to the rectangular waveguide. Accordingly, when light input to the converter 1 contains a basic mode component TE0 and a high-order mode component TE1, the high-order mode component TE1 will be removed or suppressed in the converter 1.

Providing a large spacing between the waveguide 11b and the leading end of the waveguide 12b will result in little output of a high-order mode component TE1 to the rectangular waveguide. However, extending the spacing between the waveguide 11b and the leading end of the waveguide 12b will increase the size of the converter 1. Accordingly, the spacing between the waveguide 11b and the leading end of the waveguide 12b will preferably be designed in consideration of these facts.

Figure 10:
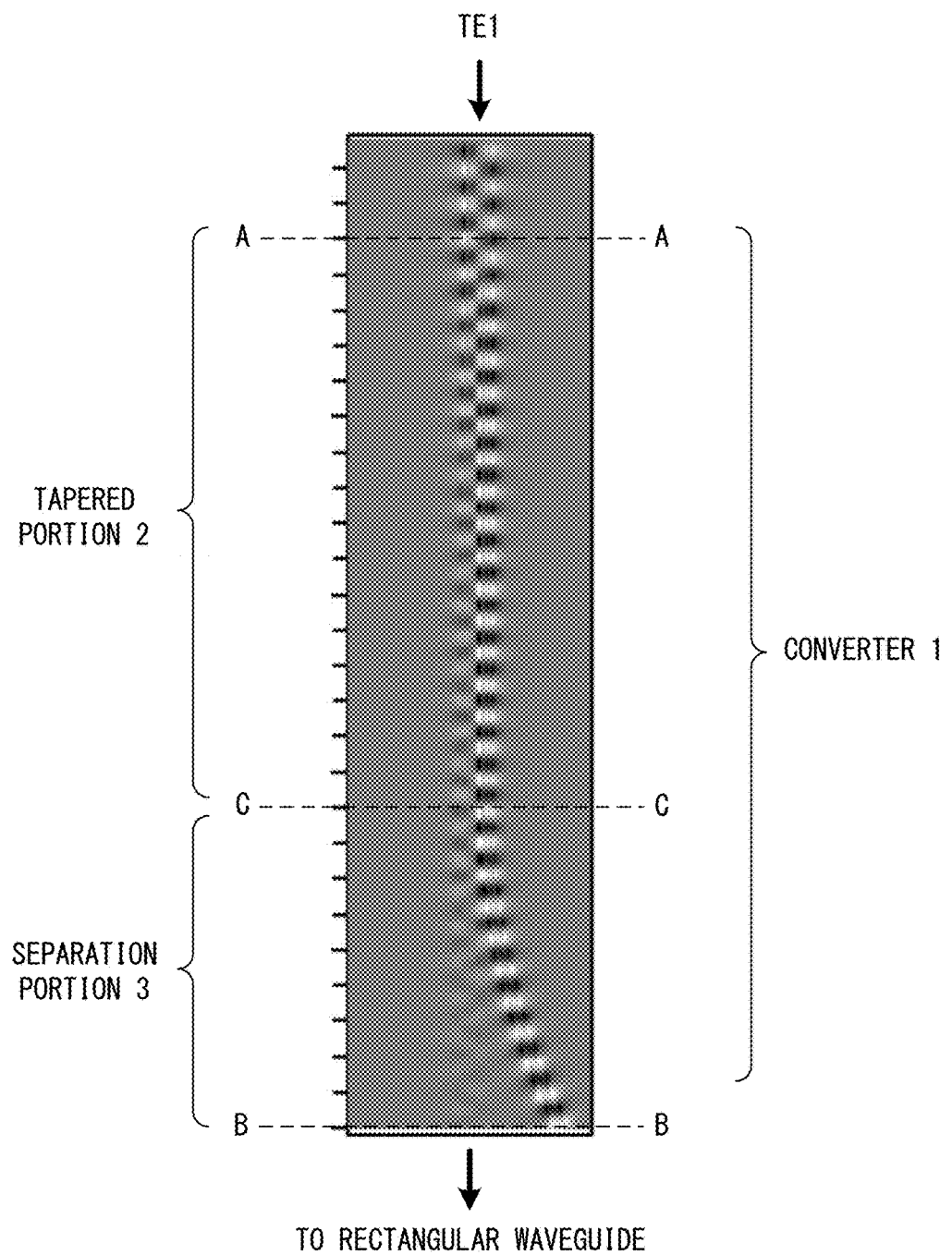
FIG. 10 illustrates a simulation result for electric fields attained when a TE1 component is input to a converter depicted in FIG. 6.

FIG. 10 illustrates a simulation result for electric fields attained when a TE1 component is input to the converter 1 depicted in FIG. 6. In FIG. 10, as the whiteness level increases, the positive electric field becomes stronger, as in the example FIG. 5. In addition, as the blackness level increases, the negative electric field becomes stronger. Thus, the white and black stripe pattern indicates a state in which the TE1 component propagates through the optical waveguides forming the converter 1.

As indicated in FIG. 10, the TE1 component input to the converter 1 propagates through the pair of waveguides 11a and 12a formed in the tapered portion 2 and arrives at the end C-C. At the end C-C, a large proportion of the power of the TE1 component is localized in the waveguide 12a. This TE1 component is guided to the waveguide 12b formed in the separation portion 3. The waveguide 12b has an edge (i.e., a discontinuous point) at the end B-B. Thus, the vicinity of the leading end of the waveguide 12b is affected by the TE1 component. However, since the leading end of the waveguide 12b is sufficiently distant from the waveguide 11b, the electric field of the TE1 component does not arrive at the waveguide 11b. Hence, the power of the TE1 component output to the rectangular waveguide is sufficiently low. According to simulations, when a TE1 component is input to the converter 1, the power of the TE1 component output to the rectangular waveguide is −14.8 dB (i.e., about 3.3 percent) with respect to the power of the TE1 component input to the converter 1.

Figure 11A:
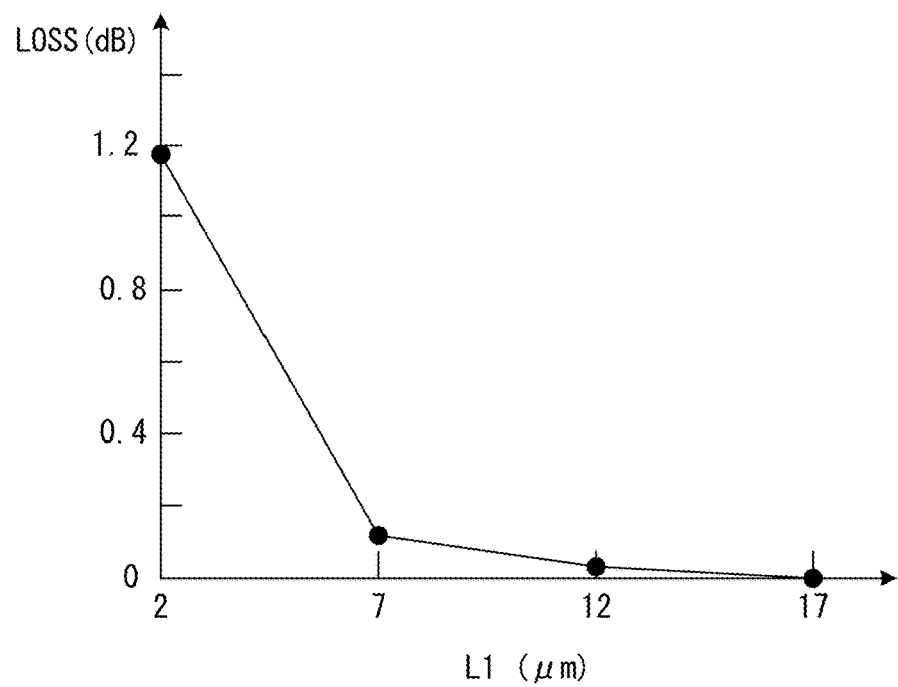
FIGS. 11A and 11B illustrate a loss of, and wavelength dependence of, basic mode component TE0.

FIG. 11A depicts a loss of basic mode component TE0 in the converter 1. The horizontal axis indicates the length of the tapered portion 2. The vertical axis indicates loss calculated using a finite difference time domain (FDTD) method. The cores of the waveguides have cross sections having the shapes depicted in FIG. 4.

Loss is dependent on the length L1 of the waveguides formed in the tapered portion 2. Specifically, loss will be small when L1 is long. This is considered to result from the shape of the cross section of the core of the waveguide 11a changing gently in the light traveling direction when L1 is long. That is, the loss is small since adiabatic conversion is established. In this example, loss is sufficiently small when L1 is 17 μm. Accordingly, the length of the tapered portion 2 of the converter 1 is set to 17 μm.

Figure 11B:
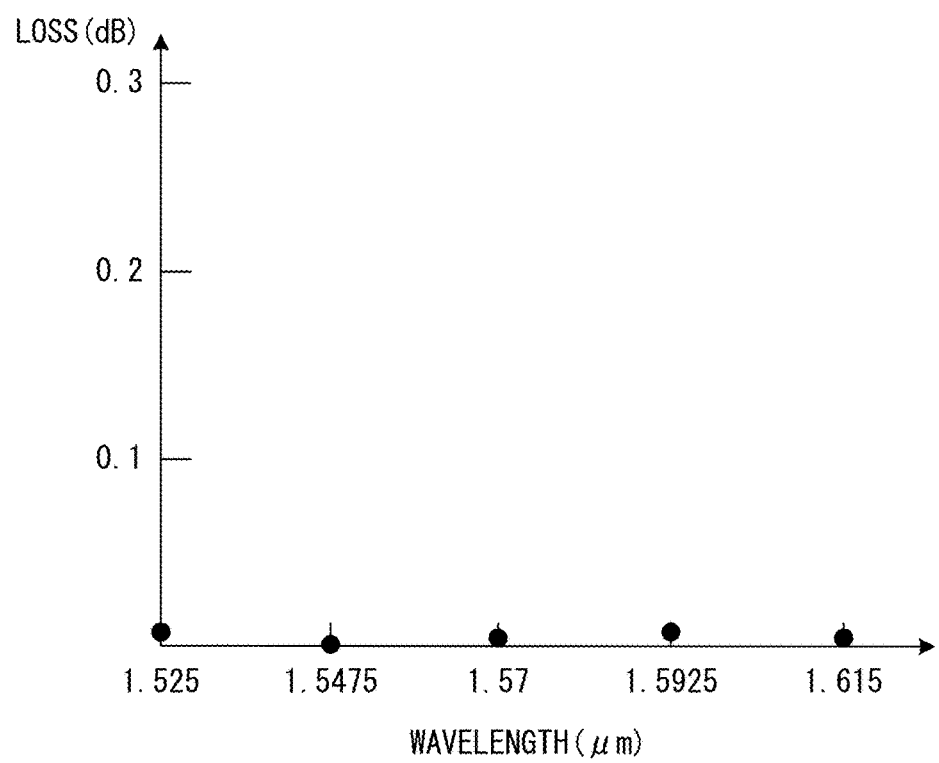

FIG. 11B depicts wavelength dependence of a basic mode component TE0 in the converter 1. The horizontal axis indicates the wavelength of light input to the converter 1. The vertical axis indicates loss calculated using an FDTD method. The cores of the waveguides have cross sections having the shapes depicted in FIG. 4, and the length of the tapered portion 2 is 17 μm.

In this example, loss is less than or equal to 0.02 dB over a wide wavelength range including a C band and an L band. Thus, a low-loss converter is implemented for a wide wavelength range. When the shape of the cross section of the core of the waveguide 11a changes gently in the light traveling direction, almost no changes are considered to be seen in the efficiency of conversion even when the wavelength of input light changes. When portions of the power of the basic mode component TE0 are guided to the waveguide 12b, the electric field of the basic mode component TE0 could scatter at the leading end of the waveguide 12b. However, the leading end of the waveguide 12b is sufficiently distant from the waveguide 11b. Hence, scattering of the electric field of the basic mode component TE0 that could occur at the leading end of the waveguide 12b will not cause a loss of basic mode component TE0 output to the rectangular waveguide.

As described above, in the configuration in accordance with embodiments of the present invention, a basic mode component TE0 propagating through the slot waveguide is guided to the rectangular waveguide with low loss. Thus, adiabatic conversion is implemented for the basic mode component TE0 between the slot waveguide and the rectangular waveguide. When input light contains a basic mode component TE0 and a high-order mode component TE1, propagation of the high-order mode component TE1 will be sufficiently suppressed in the converter 1. Hence, the configuration in accordance with embodiments of the present invention contributes to improvement of communication qualities.

Variation 1

Figure 12A:
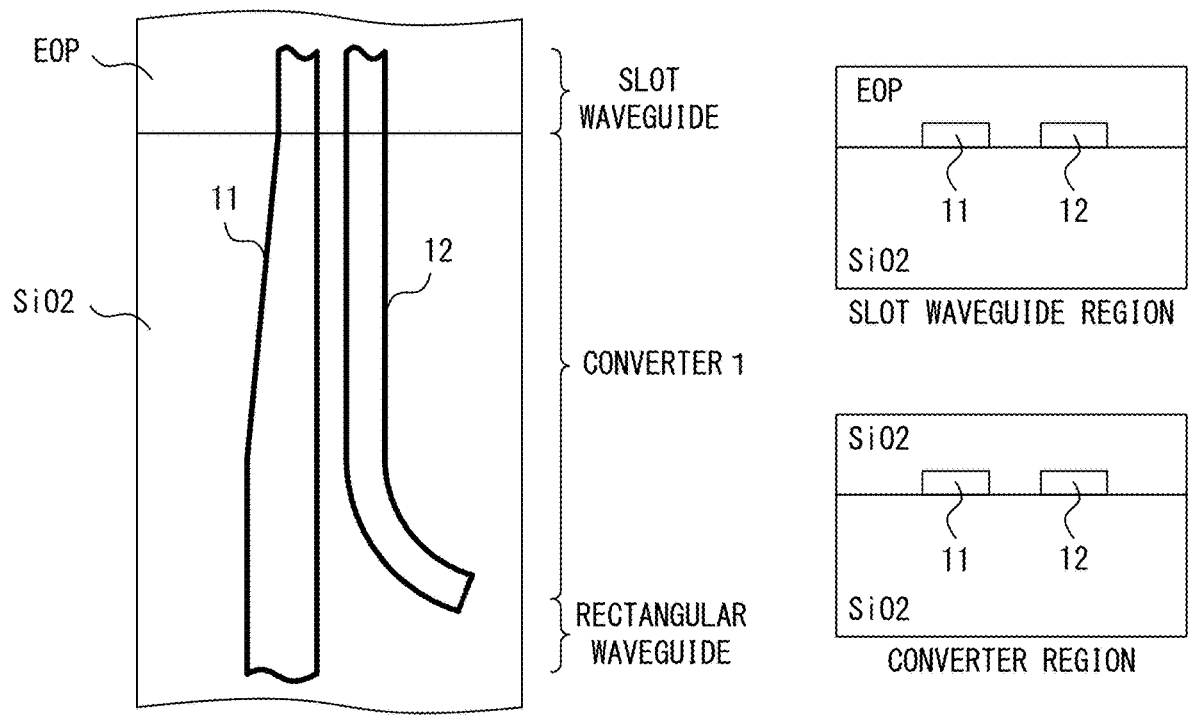
FIGS. 12A and 12B illustrate variations of the configuration of an upper cladding.
Figure 12B:
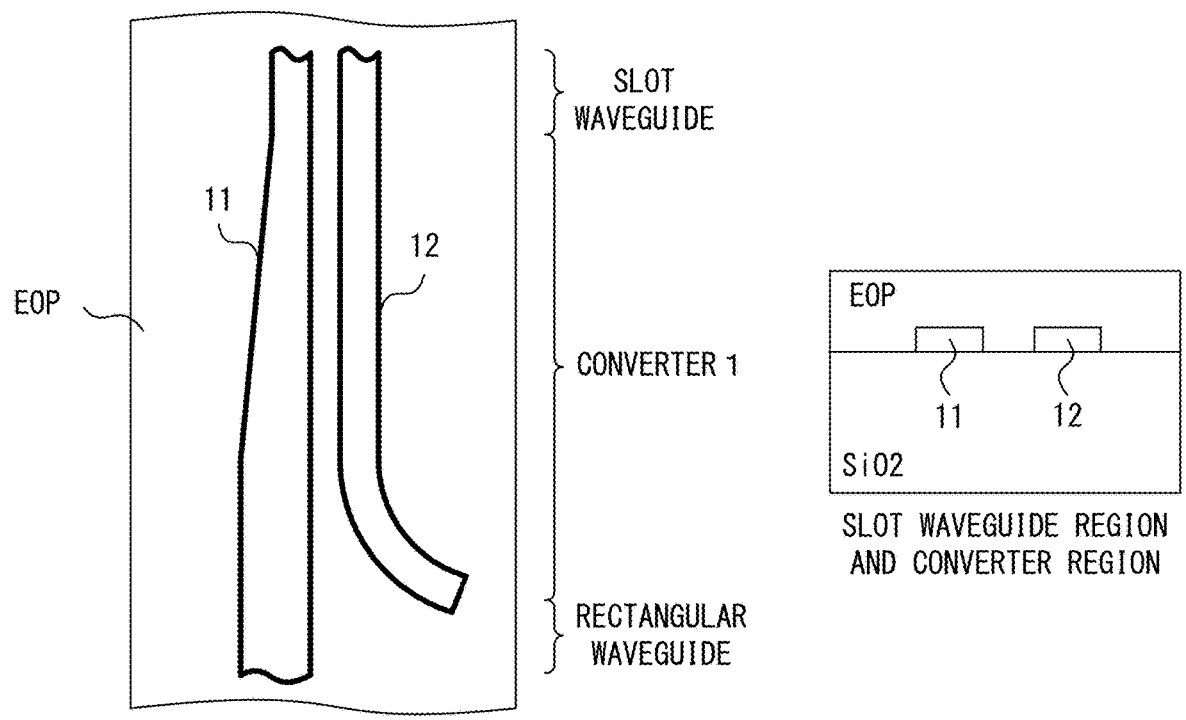

When an optical integrated device includes an optical modulator, upper-arm and lower-arm optical waveguides forming a Mach-Zehnder interferometer may be formed from a slot waveguide. For example, as depicted in FIG. 12A, an EO polymer may be applied in the vicinity of the slot waveguide forming the optical modulator. Thus, an EO polymer may be used as a material for the upper cladding of the slot waveguide. Note that the "EOP" in FIGS. 12A and 12B denotes an EO polymer.

In this case, the upper cladding of the optical waveguides forming the converter 1 may be formed from a common material. Thus, the material for the upper cladding of the optical waveguides (11, 12) forming the converter 1 may be different from the material for the upper cladding of the slot waveguide. In the example depicted in FIG. 12A, the upper cladding of the optical waveguides forming the converter 1 is formed from SiO2, as with the lower cladding. When this configuration is used, characteristics of the optical integrated device will be stabilized because the manufacturing process is highly stable. In the example depicted in FIG. 12A, the material for the upper cladding changes at the end of the converter 1. However, the material for the upper cladding may change at another position.

Embodiments of the invention are not limited to the above configuration. In particular, the material for the upper cladding of the optical waveguides (11, 12) forming the converter 1 may be the same as the material for the upper cladding of the slot waveguide. In the example depicted in FIG. 12B, when an EO polymer is applied to the core of the slot waveguide, the upper cladding of the optical waveguides forming the converter 1 are also formed from the EO polymer. When this configuration is used, the refractive index does not become discontinuous at the boundary between the region in which the slot waveguide is formed and the region in which the converter 1 is formed, and hence the waveguide mode of light is stabilized, thereby decreasing loss in the converter 1.

Variation 2

For example, as depicted in FIG. 13A, the cores of the optical waveguides (11, 12) forming the converter 1 may have cross sections shaped like rectangles. However, embodiments of the invention are not limited to this configuration. For example, the optical waveguides forming the converter 1 may be rib waveguides having slabs, as depicted in FIG. 13B. Waveguides such as rectangular waveguides and rib waveguides may have rounded corners resulting from a certain process in manufacturing or may have substantially or almost right-angled corners. The sidewalls of the waveguides are perpendicular to the substrate but may be inclined due to a certain process in manufacturing.

The material for the core/cladding of the optical waveguides is not limited to Si/SiO2, and the optical waveguides may be, for example, SiO2-based planner-lightwave-circuit (PLC) waveguides or InP waveguides. However, waveguides having cores formed from Si and upper and lower claddings formed from SiO2 will be preferable because a miniaturized device can be provided owing to a large difference in refractive index between the cores and the claddings.

In the examples described above, the converter 1 implements conversion from the slot waveguide to the rectangular waveguide. However, the present invention is not limited to this configuration. In particular, owing to reversibility of passive waveguides with respect to time, the configuration in accordance with embodiments of the invention also allows for conversion from the rectangular waveguide to the slot waveguide. Meanwhile, the converter 1 has functions for a TM mode similar to the functions for the TE mode. The TM mode is a waveguide mode involving a main electric field component in a direction perpendicular to the light traveling direction and to the substrate.

In the separation portion 3 in the examples described above, the waveguide coupled to the rectangular waveguide extends straight (i.e., the waveguide 11b extends straight), and the waveguide that is not connected to the rectangular waveguide extends away from the waveguide 11b (i.e., the waveguide 12b extends away from the waveguide 11b). However, the present invention is not limited to this configuration. For example, the waveguide 12b may extend straight, and the waveguide 11b may extend away from the waveguide 12b. In another example, the waveguides 11b and 12b may extend away from each other. However, since a main signal (or a basic mode component) propagates through the waveguide 11b, it will be desirable that the waveguide 11b extend straight and the waveguide 12b extend away from the waveguide 11b in order to minimize the bending loss.

In the examples described above, the cross-sectional area of a core is adjusted by changing the width of the core. However, the cross-sectional area of a core may be adjusted by changing the height of the core or by changing both the width and height of the core. However, when the core of a waveguide is formed by lithography and etching, the width of the core is determined by the shape of a mask. Thus, a method that adjusts the cross-sectional area of a core by changing the width of the core will be a preferable method for preventing the fabrication process from being complicated.

Variation 3

When input light contains a basic mode component TE0 and a high-order mode component TE1, the high-order mode component TE1 will be guided to the waveguide 12 in the separation portion 3. Then, the high-order mode component TE1 may be reflected from the leading end of the waveguide 12 and return to the tapered portion 2. The returning light could be reflected again due to roughness of a sidewall and interfere with signal light. When a laser device is provided on an input side of the modulator, an oscillation wavelength could unstably behave due to returning light.

Figure 14A:
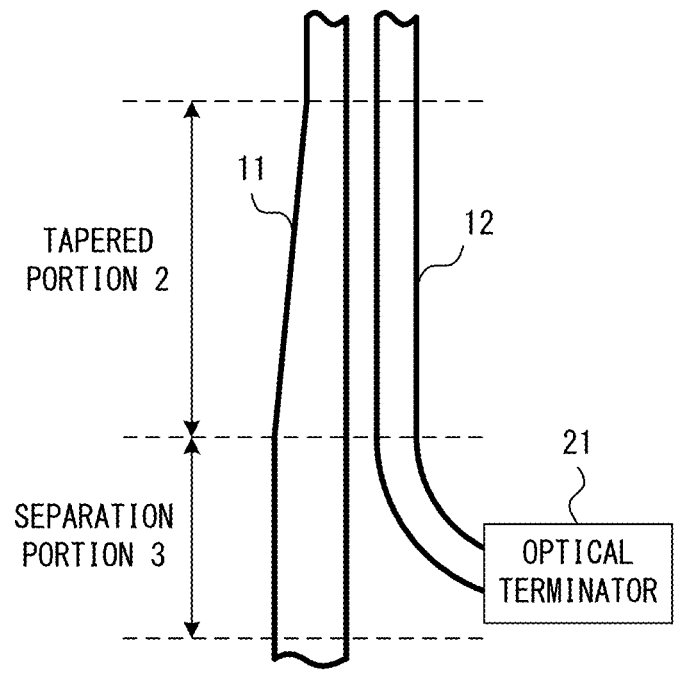
FIGS. 14A-14D illustrate examples of optical terminators.

Accordingly, as depicted in FIG. 14A, the converter 1 may include an optical terminator 21 at the leading end of the waveguide 12. In this configuration, a high-order mode component TE1 propagating through the waveguide 12 in the separation portion 3 is terminated by the optical terminator 21, thereby suppressing reflection. Thus, providing the optical terminator 21 at the leading end of the waveguide 12 enhances the capability to remove or suppress a high-order mode component. This is also true for a situation in which the present application is used for a site of conversion from the rectangular waveguide to the slot waveguide. In such a situation, light reflected from a certain portion could be reflected from the leading end of the waveguide 12, propagate again in the same direction as an optical signal, and then be converted into TE0 due to the influence of roughness of a sidewall or the like, thereby interfering with signal light. Accordingly, a structure provided with the terminator will be effective irrespective of where the terminator is to be used.

Figure 14B:
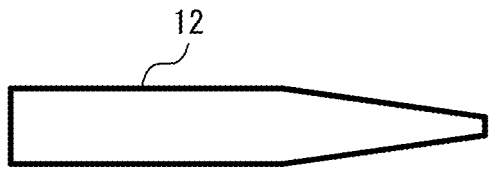
Figure 14C:
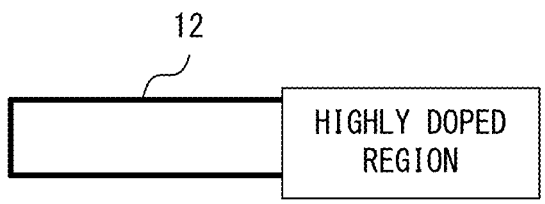
Figure 14D:
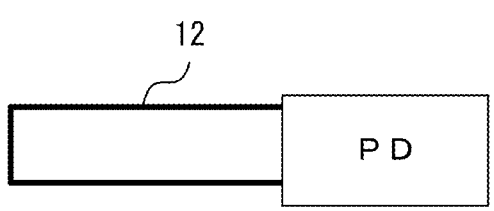

For example, the optical terminator 21 may be implemented by making the leading end of the waveguide 12 have a tapered structure, as depicted in FIG. 14B. In this case, the width of the core of the waveguide 12 gradually decreases in the separation portion 3. The optical terminator 21 may also be implemented by highly doping the portion of the waveguide 12 close to the leading end with a light-absorptive material, as depicted in FIG. 14C. In this case, for example, the core of the waveguide 12b in the separation portion 3 may be highly doped with a light-absorptive material. The light-absorptive material is not particularly limited and may be a publicly known material. Alternatively, the optical terminator 21 may be implemented by providing a photodetector such as a photodiode at the leading end of the waveguide 12, as depicted in FIG. 14D. In this case, light arriving at the leading end of the waveguide 12 is converted into a current, thereby suppressing reflection.

Variation 4

As described above, the converter 1 is provided between the slot waveguide and the rectangular waveguide. However, the width of the waveguides forming the converter 1 (R1, R2) is not necessarily the same as the width of the slot waveguide and/or the width of the rectangular waveguide. Accordingly, the converter 1 may have a configuration for converting the width of the waveguides.

In the example depicted in FIG. 15, the converter 1 includes a waveguide-width conversion portion 4 between the slot waveguide and the tapered portion 2. The waveguide-width conversion portion 4 is implemented by tapered optical waveguides that are located between the slot waveguide and the waveguides 11 and 12 formed in the tapered portion 2 and each have a continuously changing width. In this case, the waveguide-width conversion portion 4 may match the spacing between the pair of waveguides forming the slot waveguide to the spacing between the waveguides 11 and 12 formed in the tapered portion 2. The converter 1 also includes a waveguide-width conversion portion 5 between the separation portion 3 and the rectangular waveguide. The waveguide-width conversion portion 5 is implemented by a tapered optical waveguide that is located between the waveguide 11 formed in the separation portion 3 and the rectangular waveguide and has a continuously changing width. This configuration will allow the converter 1 to couple a slot waveguide and a rectangular waveguide, both of which may have any shape. Note that the waveguide-width conversion portions 4 and 5 may be portions of the converter 1 or may be formed outside the coveter 1.

Variation 5

When the slot waveguide includes slabs and the waveguides 11 and 12 forming the coveter 1 have cross sections shaped like rectangles, the converter 1 may include a slab increasing portion 6 between the slot waveguide and the tapered portion 2, as depicted in FIG. 16. The slabs are formed from the same material as the cores in such a manner as to be lower than rails. The slab increasing portion 6 is formed to gradually narrow the slab regions in the light traveling direction. Thus, the slabs extend horizontally on a X1-X1 cross section where the slot waveguide is formed. The regions in which the slabs are formed are smaller on a X2-X2 cross section where the slab increasing portion 6 is provided than on the X1-X1 cross section. No slabs are formed on a X3-X3 cross section where the tapered portion 2 is provided. Forming the slab regions in such a manner to gradually become narrower in the slab increasing portion 6 in the light traveling direction will implement adiabatic conversion contributing to a decrease in loss in the coveter 1.

Variation 6

When an optical integrated device includes an optical modulator, optical waveguides forming the optical modulator may be formed from a slot waveguide. In this case, the cores of the slot waveguides may be doped with carriers. For example, a known optical modulator in which an EO polymer is applied in the vicinities of optical waveguides may be configured such that electric resistance is decreased by doping the cores with carriers in order to apply a voltage to the EO polymer.

Figure 17:
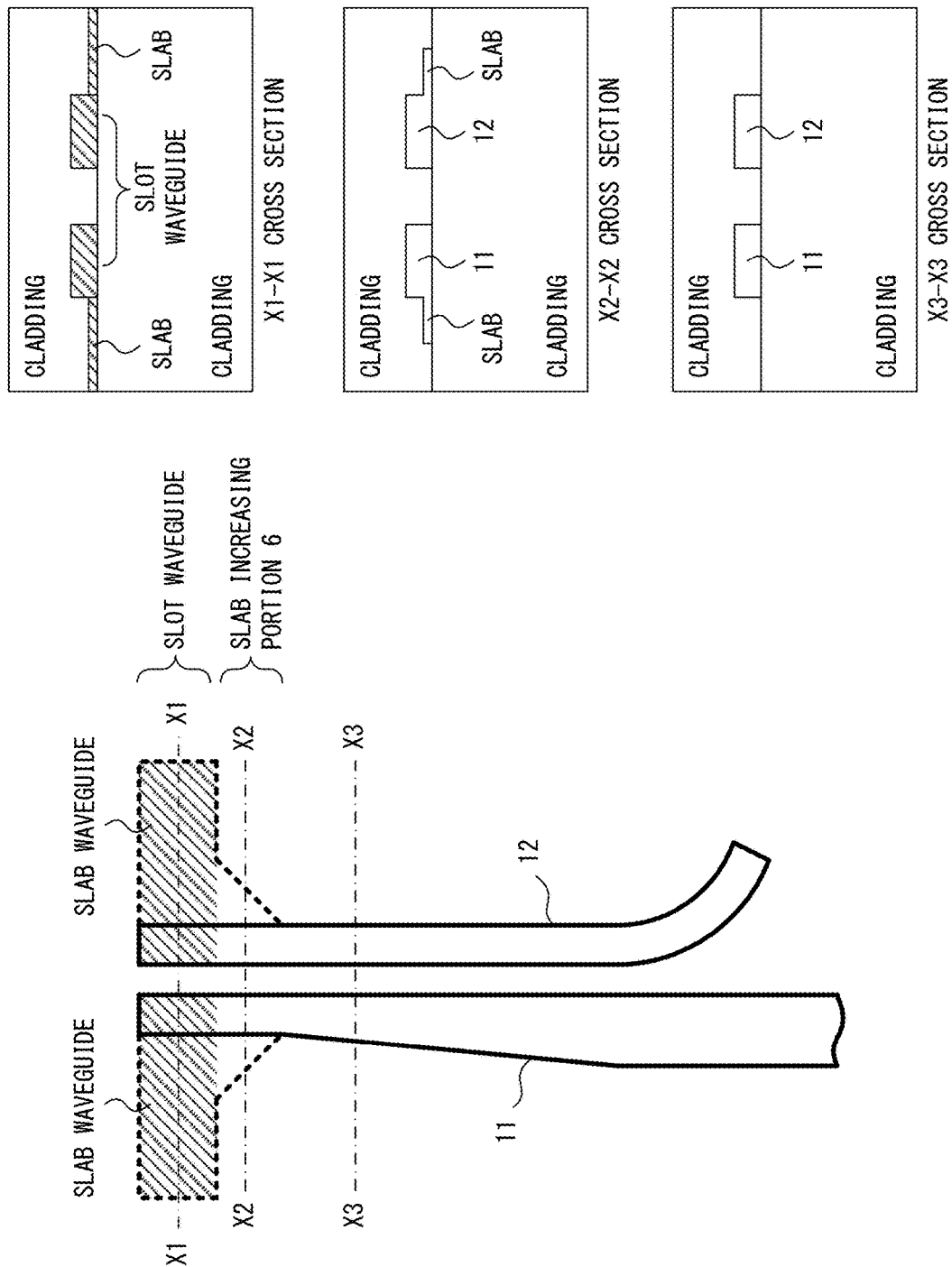
FIG. 17 illustrates an example of a converter coupling a slot waveguide doped with carriers and a rectangular waveguide.

FIG. 17 illustrates an example of a converter coupling a slot waveguide doped with carriers and a rectangular waveguide. The regions represented using oblique lines in FIG. 17 indicate regions doped with carriers.

When input light contains a basic mode component TE0 and a high-order mode component TE1, the converter 1 separates the high-order mode component TE1 from the basic mode component TE0 and guides the high-order mode component TE1 to the waveguide 12, as described above. Here, in a case where the optical terminator 21 depicted in FIG. 14A is not provided, the high-order mode component TE1 will be reflected from the leading end of the waveguide 12 and guided to the slot waveguide. In this case, when the cores of the slot waveguide are doped with carriers, absorption loss will occur in the slot waveguide. However, the electric field of the high-order mode component TE1 easily spreads in comparison with the basic mode component TE0. Hence, when the cores of the slot waveguide are doped with carriers, a loss of high-order mode component TE1 will be larger than a loss of basic mode component TE0. In particular, when the high-order mode component TE1 is reflected from the leading end of the waveguide 12 and thus guided to the slot waveguide, the high-order mode component TE1 will be absorbed in the slot waveguide.

Accordingly, when the slot waveguide is doped with carriers, the influence of the high-order mode component TE1 can be decreased without the optical terminator 21 depicted in FIG. 14A being provided. As the optical terminator 21 does not need to be provided, any configuration can be determined for the leading end of the waveguide 12, thereby enhancing the degree of freedom of design. However, the optical terminator 21 may be provided at the leading end of the waveguide 12 even when the slot waveguide is doped with carriers.

It should be noted that the embodiment illustrated in FIG. 6 and variations 1-6 can be optionally combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical waveguide device that is implemented between a slot waveguide and a rectangular waveguide, the optical waveguide device comprising:

a tapered portion; and a separation portion that is implemented between the tapered portion and the rectangular waveguide, wherein the tapered portion includes a first core that is coupled to one of cores of the slot waveguide, and a second core that is coupled to the other of the cores of the slot waveguide and formed parallel to the first core, the separation portion includes
  a third core that is coupled to the first core and the rectangular waveguide, and
  a fourth core that is coupled to the second core,
a cross-sectional area of the first core and a cross-sectional area of the second core are substantially equal at a first end of the tapered portion that is located on a side on which the slot waveguide is provided,
the cross-sectional area of the first core is larger than the cross-sectional area of the second core at a second end of the tapered portion that is located on a side on which the separation portion is provided,
a shape of a cross section of the first core changes continuously between the first end and the second end in the tapered portion, and
the fourth core is formed by a curved waveguide of substantially constant width such that a spacing between the third core and the fourth core is continuously extended in the separation portion.

2. The optical waveguide device according to claim 1, further comprising: an optical terminator at a leading end of the fourth core.

3. The optical waveguide device according to claim 1, further comprising: a waveguide that is located between the one of cores of the slot waveguide and the first core at the first end and has a continuously changing width, and a waveguide that is located between the other of the cores of the slot waveguide and the second core at the first end and has a continuously changing width.

4. The optical waveguide device according to claim 1, further comprising: a waveguide that has a continuously changing width and is located between the rectangular waveguide and the third core at an end of the separation portion that is located on a side on which the tapered portion is not provided.

5. The optical waveguide device according to claim 1, wherein
  a shape of a cross section of each of the first and second cores is a rectangle, and
  the optical waveguide device further comprises: slabs that are located in regions in the vicinity of the first end and around the first and second cores, are formed from the same material as the first and second cores, and have a less height than the first and second cores.

6. The optical waveguide device according to claim 1, wherein the cores of the slot waveguide are doped with carriers.

7. An optical waveguide device that is implemented between a slot waveguide and a rectangular waveguide, the optical waveguide device comprising:
  a tapered portion; and
  a separation portion that is implemented between the tapered portion and the rectangular waveguide,
  wherein the tapered portion includes
    a first core that is coupled to one of cores of the slot waveguide, and
    a second core that is coupled to the other of the cores of the slot waveguide and formed parallel to the first core,
  wherein the separation portion includes
    a third core that is coupled to the first core and the rectangular waveguide, and
    a fourth core that is coupled to the second core,
  wherein a cross-sectional area of the first core and a cross-sectional area of the second core are substantially equal at a first end of the tapered portion that is located on a side on which the slot waveguide is provided,
  wherein the cross-sectional area of the first core is larger than the cross-sectional area of the second core at a second end of the tapered portion that is located on a side on which the separation portion is provided,
  wherein a shape of a cross section of the first core changes continuously between the first end and the second end in the tapered portion,
  wherein a spacing between the third core and the fourth core is continuously extended in the separation portion, and
  wherein the optical waveguide device further includes a waveguide that is located between the one of cores of the slot waveguide and the first core at the first end and has a continuously changing width, and a waveguide that is located between the other of the cores of the slot waveguide and the second core at the first end and has a continuously changing width.

8. An optical waveguide device that is implemented between a slot waveguide and a rectangular waveguide, the optical waveguide device comprising:
  a tapered portion; and
  a separation portion that is implemented between the tapered portion and the rectangular waveguide,
  wherein the tapered portion includes
    a first core that is coupled to one of cores of the slot waveguide, and
    a second core that is coupled to the other of the cores of the slot waveguide and formed parallel to the first core,
  wherein the separation portion includes
    a third core that is coupled to the first core and the rectangular waveguide, and
    a fourth core that is coupled to the second core,
  wherein a cross-sectional area of the first core and a cross-sectional area of the second core are substantially equal at a first end of the tapered portion that is located on a side on which the slot waveguide is provided,
  wherein the cross-sectional area of the first core is larger than the cross-sectional area of the second core at a second end of the tapered portion that is located on a side on which the separation portion is provided,
  wherein a shape of a cross section of the first core changes continuously between the first end and the second end in the tapered portion,
  wherein a spacing between the third core and the fourth core is continuously extended in the separation portion, and
  wherein the optical waveguide device further includes a waveguide that has a continuously changing width and is located between the rectangular waveguide and the third core at an end of the separation portion that is located on a side on which the tapered portion is not provided.

9. An optical waveguide device that is implemented between a slot waveguide and a rectangular waveguide, the optical waveguide device comprising:
  a tapered portion; and
  a separation portion that is implemented between the tapered portion and the rectangular waveguide,
  wherein the tapered portion includes
    a first core that is coupled to one of cores of the slot waveguide, and
    a second core that is coupled to the other of the cores of the slot waveguide and formed parallel to the first core, wherein the separation portion includes
a third core that is coupled to the first core and the rectangular waveguide, and
a fourth core that is coupled to the second core,
wherein a cross-sectional area of the first core and a cross-sectional area of the second core are substantially equal at a first end of the tapered portion that is located on a side on which the slot waveguide is provided,
wherein the cross-sectional area of the first core is larger than the cross-sectional area of the second core at a second end of the tapered portion that is located on a side on which the separation portion is provided,
wherein a shape of a cross section of the first core changes continuously between the first end and the second end in the tapered portion,
wherein a spacing between the third core and the fourth core is continuously extended in the separation portion,
wherein a shape of a cross section of each of the first and second cores is a rectangle, and
wherein the optical waveguide device further includes slabs that are located in regions in the vicinity of the first end and around the first and second cores, the slabs being formed from the same material as the first and second cores, and the slabs having a less height than the first and second cores.

10. An optical waveguide device that is implemented between a slot waveguide and a rectangular waveguide, the optical waveguide device comprising:
a tapered portion; and
a separation portion that is implemented between the tapered portion and the rectangular waveguide,
wherein the tapered portion includes
a first core that is coupled to one of cores of the slot waveguide, and
a second core that is coupled to the other of the cores of the slot waveguide and formed parallel to the first core,
wherein the separation portion includes
a third core that is coupled to the first core and the rectangular waveguide, and
a fourth core that is coupled to the second core,
wherein a cross-sectional area of the first core and a cross-sectional area of the second core are substantially equal at a first end of the tapered portion that is located on a side on which the slot waveguide is provided,
wherein the cross-sectional area of the first core is larger than the cross-sectional area of the second core at a second end of the tapered portion that is located on a side on which the separation portion is provided,
wherein a shape of a cross section of the first core changes continuously between the first end and the second end in the tapered portion,
wherein a spacing between the third core and the fourth core is continuously extended in the separation portion, and
wherein the cores of the slot waveguide are doped with carriers.

* * * * *